United States Patent
Rangarajan et al.

(10) Patent No.: US 6,832,304 B2
(45) Date of Patent: Dec. 14, 2004

(54) SYSTEM, METHOD AND COMPUTER PROGRAM PRODUCT FOR MAPPING SYSTEM MEMORY IN A MULTIPLE NODE INFORMATION HANDLING SYSTEM

(75) Inventors: Madhusudhan Rangarajan, Austin, TX (US); Paul Dennis Stultz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 374 days.

(21) Appl. No.: 10/052,042

(22) Filed: Jan. 17, 2002

(65) Prior Publication Data

US 2003/0135708 A1 Jul. 17, 2003

(51) Int. Cl.[7] .............................................. G06F 12/00
(52) U.S. Cl. ...................... 711/202; 711/206
(58) Field of Search ................. 711/206, 202

(56) References Cited

U.S. PATENT DOCUMENTS

| | | |
|---|---|---|
| 5,293,631 A | 3/1994 | Rau et al. |
| 5,321,836 A | 6/1994 | Crawford et al. |
| 5,671,229 A | 9/1997 | Harari et al. |
| 5,682,512 A * | 10/1997 | Tetrick ....................... 711/202 |
| 5,682,529 A | 10/1997 | Hendry et al. |
| 5,715,418 A | 2/1998 | Atsatt et al. |
| 5,719,808 A | 2/1998 | Harari et al. |
| 5,754,817 A | 5/1998 | Wells et al. |
| 5,819,087 A | 10/1998 | Le et al. |
| 5,944,820 A | 8/1999 | Beelitz |
| 5,974,517 A | 10/1999 | Gaudet |
| 6,029,237 A | 2/2000 | Beelitz |
| 6,032,223 A | 2/2000 | Beelitz |
| 6,032,239 A | 2/2000 | Beelitz |
| 6,041,395 A | 3/2000 | Beelitz |
| 6,295,584 B1 * | 9/2001 | DeSota et al. ............... 711/147 |
| 6,351,798 B1 * | 2/2002 | Aono .......................... 712/11 |
| 6,701,421 B1 * | 3/2004 | Elnozahy et al. ........... 711/170 |

OTHER PUBLICATIONS

Intel Multiprocessor Specification Version 1.4 May 1997.*

* cited by examiner

Primary Examiner—Mano Padmanabhan
Assistant Examiner—Paul Baker
(74) Attorney, Agent, or Firm—Haynes and Boone, LLP

(57) ABSTRACT

A system, method, and computer program product for detecting a first memory in a first node and detecting a second memory in a second node coupled to the first node. The system, method, and computer program product ensure that a first set of contiguous addresses is mapped to a portion of the first memory where the first set of contiguous addresses each have a value lower than a four gigabyte address, and ensure that a second set of contiguous addresses is mapped to a portion of the second memory where the second set of contiguous addresses each have a value lower than the four gigabyte address.

15 Claims, 2 Drawing Sheets

SYSTEM, METHOD AND COMPUTER PROGRAM PRODUCT FOR MAPPING SYSTEM MEMORY IN A MULTIPLE NODE INFORMATION HANDLING SYSTEM

BACKGROUND

The disclosures herein relate generally to nodes and more particularly to a system, method, and computer program product for mapping a system memory in a multiple node information handling system.

Intel Architecture-32 (IA-32) information handling systems that include more than four gigabytes of physical memory use an addressing mode known as Physical Address Extension (PAE) mode. Some applications and operating systems, however, can require the use of memory that resides below the four gigabyte boundary.

In a multiple processor non-uniform memory architecture (NUMA) system that includes multiple nodes, each node typically includes some local memory. Where a particular node requires memory that is not local to the node, then the node generally expended additional overhead to access the required memory from another node. For example, if a node attempts to execute an operating system or application that requires the use of memory that resides below the four gigabyte boundary and the node does not include local memory below the four gigabyte boundary, then the node may use memory in another node that is below the four gigabyte boundary. This use of the memory of another node may reduce the performance of the system.

Accesses to memory in a system with more than four gigabytes typically require the use of operating system (OS) library extensions. The use of OS library extensions may require additional processing to be performed for these accesses and may reduce the performance of the system. For applications that do not use this memory, the operating system may use the memory beyond four gigabyte boundary for paging.

It would be desirable to be able to map a system memory in a multiple processor system to allow a node to execute as many programs as possible in local memory. Accordingly, what is needed is a system, method, and computer program product for mapping a system memory in a multiple node information handling system.

SUMMARY

One embodiment, accordingly, provides an information handling system for detecting a first memory in a first node and detecting a second memory in a second node coupled to the first node. The system ensures that a first set of contiguous addresses is mapped to a portion of the first memory where the first set of contiguous addresses each have a value lower than a four gigabyte address, and ensures that a second set of contiguous addresses is mapped to a portion of the second memory where the second set of contiguous addresses each have a value lower than the four gigabyte address.

A principal advantage of this embodiment is that various shortcomings of previous techniques are overcome. For example, processing efficiency in a multiple processor node may be increased by ensuring that memories in each node are mapped to include addresses between zero and four gigabytes.

DETAILED DESCRIPTION

Figure 1:
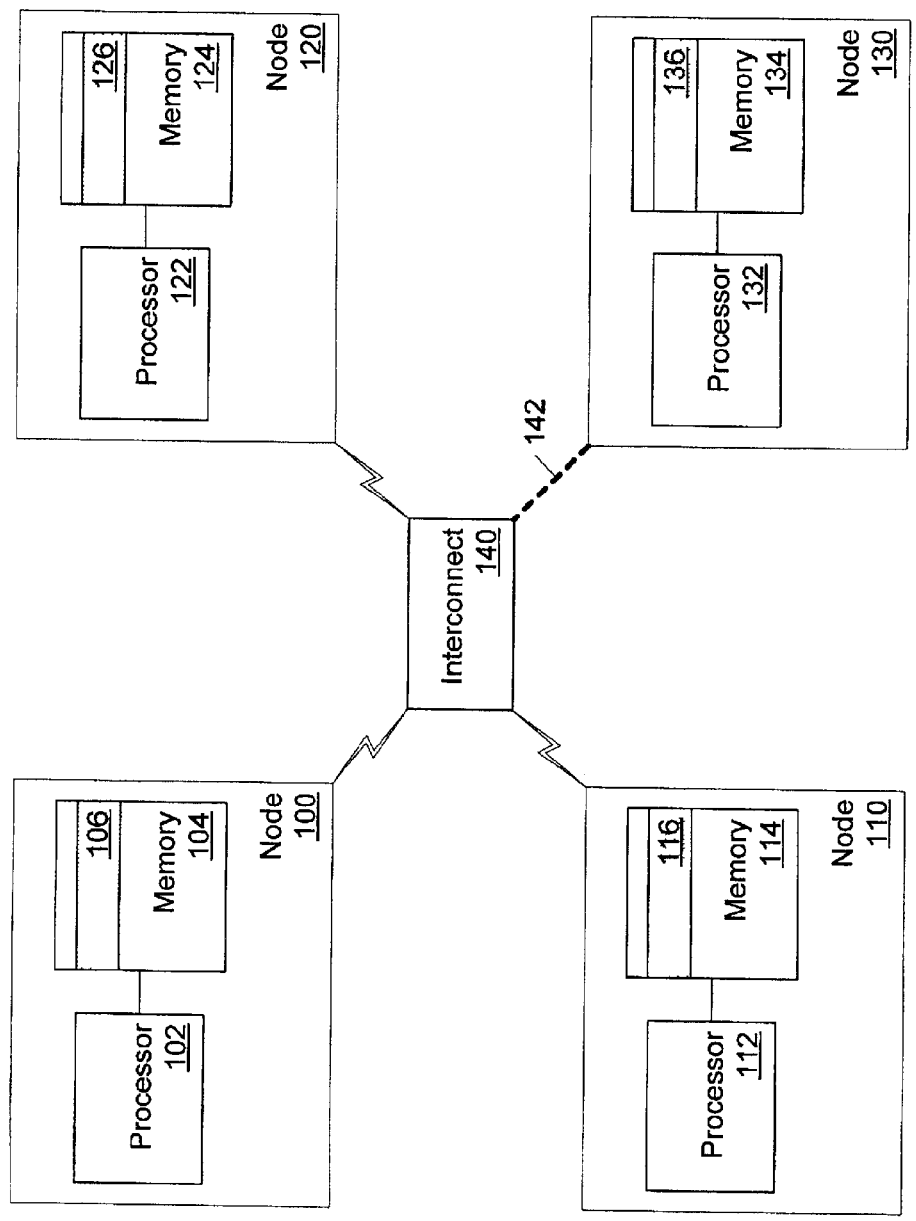
FIG. 1 is a diagram illustrating an embodiment of a system configured to map a system memory in a multiple node information handling system.

FIG. 1 is a diagram illustrating an embodiment of a system 10 configured to map a system memory. System 10 is an information handling system that is an instrumentality or aggregate of instrumentalities primarily designed to compute, classify, process, transmit, receive, retrieve, originate, switch, store, display, manifest, detect, record, reproduce, handle, or utilize any form of information, intelligence or data for business, scientific, control or other purposes.

System 10 includes nodes 100, 110, 120, and 130 configured to couple together through an interconnect 140. Other information handling systems may include numbers or types of nodes other than those shown in FIG. 1. The nodes in these systems may be grouped into domains of nodes that have been associated to form a complete and independent system which shares resources. A domain may include multiple nodes that each include a processor and a memory and input/output nodes that are linked through a node controller.

In the initial state shown in FIG. 1, node 130 is not coupled to system 10 as indicated by a dotted line 142. Node 100 includes a processor 102 that operates in conjunction with a memory 104. Node 110 includes a processor 112 that operates in conjunction with a memory 114. Node 120 includes a processor 122 that operates in conjunction with a memory 124. Node 130 includes a processor 132 that operates in conjunction with a memory 134. Memories 104, 114, 124, and 134 will be referred to collectively as a system memory of system 10. Memories 104, 114, 124, and 134 each include a portion 106, 116, 126, and 136, respectively. Interconnect 140 represents any suitable connection and communication mechanism for allowing nodes 100, 110, 120, and 130 to operate as multiprocessing system 10.

Each node 100, 110, 120, and 130 comprises a node that conforms to the IA-32 architecture and includes hardware and software components that are not shown in FIG. 1. Software components may include a basic input output system (BIOS) or other system firmware, an operating system, and one or more applications. The BIOS or system firmware of each node system initializes that node and causes the operating system to boot. The BIOS or system firmware may include a power on self test (POST) configured to perform diagnostic tests on a node. In other embodiments, nodes 100, 110, 120, and/or 130 may conform to an architecture other than the IA-32 architecture.

System 10 is configured to operate as a non-uniform memory architecture (NUMA) system. In system 10, nodes 100, 110, 120, and 130 may each cause tasks or other software processes to execute on other nodes. System 10 includes a boot strap processor (BSP) configured to detect each node 100, 110, 120, and 130, initialize system 10, and map the system memory. Although any node of nodes 100, 110, 120, and 130 may serve as the BSP, node 100 will be designated as the BSP for purposes of the discussion below.

As described above, some operating systems and applications are required to operate in memory below four gigabytes IA-32 systems. More specifically, these operating systems and applications are executed using memory addresses whose values are between zero, represented as 0h00000000 in hexadecimal format, and four gigabytes, represented as 0hFFFFFFFF in hexadecimal format. To allow nodes 100, 110, 120, to 130 execute operating systems and applications that operate in memory below four gigabytes locally, system 10 ensures that the system memory is mapped such that each node 100,110,120, and 130 includes a portion of the system memory below the four gigabyte boundary. Accordingly, memory portions 106, 116, 126, and 136 in nodes 100, 110,120, and 130 are mapped such that the range of address values of each memory portion are below four gigabytes.

Figure 2:
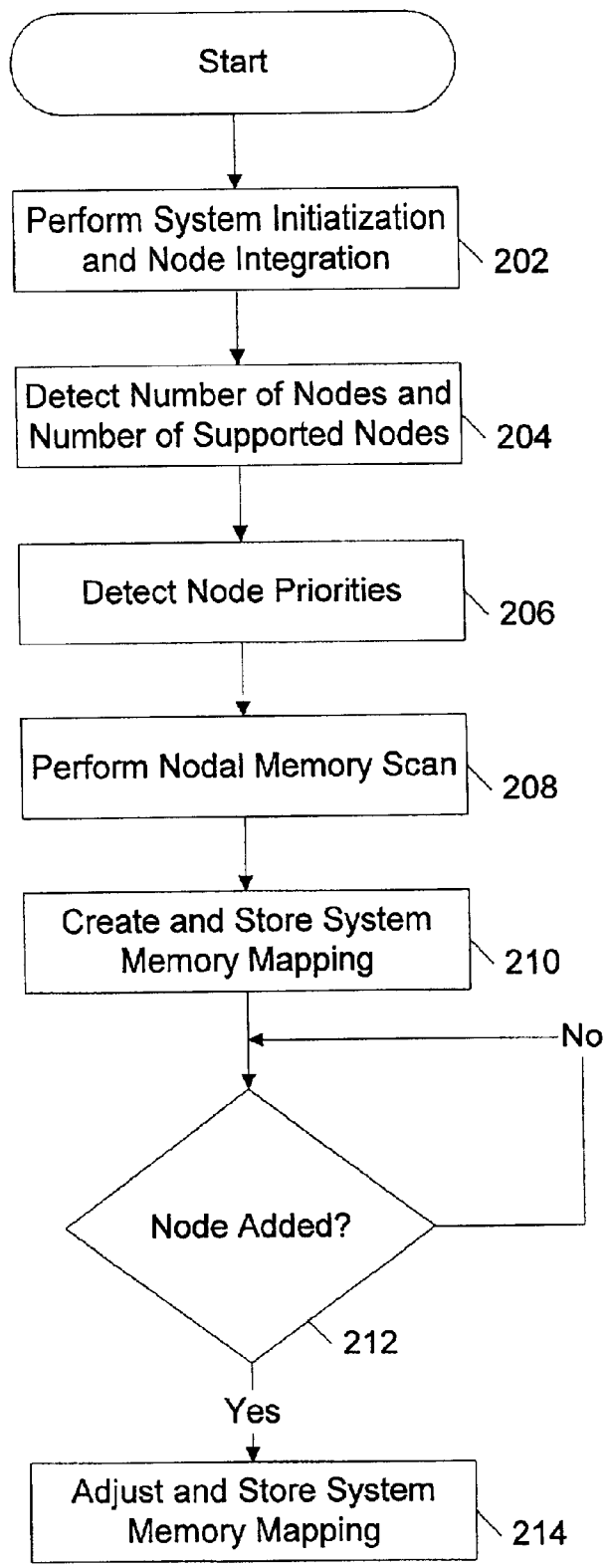
FIG. 2 is a flow chart illustrating an embodiment of a method for mapping a system memory in a multiple node information handling system.

FIG. 2 is a flow chart illustrating an embodiment of a method for mapping the system memory in system 10 as shown in FIG. 1. The steps illustrated in FIG. 2 are performed by node 100 as the BSP. In one embodiment, the steps described below are performed by a BIOS within node 100. In other embodiments, some or all of the steps may be included in an operating system, a driver, or another application of node 100.

Node 100 begins by performing a system initialization and node integration as indicated in a step 202. In doing so, node 100 causes nodes 100, 110, 120, and 130 to be able to operate as multiprocessing system 10. Node 100 detects the number of nodes in system 100 as well as the number of nodes supported by system 10 as indicated in a step 204. In the embodiment shown in FIG. 1, node 100 initially detects nodes 110 and 120 as being connected to system 10. As indicated by the dotted line 142, node 130 is not connected to system 10 initially. The connection of node 130 will be discussed below with references to steps 212 and 214.

Node 100 detects priorities for each node 100, 110, and 120 as indicated in a step 206. For example, each node may be a high priority node or a low priority node, or may have other priority designations according to architectural and/or design choices.

Node 100 performs a nodal memory scan as indicated in a step 208. During the nodal memory scan, node 100 causes memories 104, 114, and 124 and the characteristics thereof to be detected.

Using the information gathered in steps 202, 204, 206, and 208, node 100 creates and stores a system memory mapping as indicated in a step 210. The system memory mapping created by node 100 maps the addresses between zero and four gigabytes to optimize the use of this region of system memory between nodes 100, 110, and 120. Accordingly, memory portions 106, 116, and 126 in nodes 100, 110, and 120, respectively, may each be mapped such that their respective address values are between zero and four gigabytes. Node 100 ensures that as many of nodes 100, 110, and 120 in system 10 include some portion of memory whose address values are below the four gigabyte value. The mapping created by node 100 is stored in chipset registers (not shown) each node 100, 110, and 120 or in another location designated by the architecture of system 10. The mapping may be stored in Advanced Configuration and Power Interface (ACPI) tables such as static resource affinity tables (SRAT) in each node 100, 110, and 120.

The mapping of the zero to four gigabytes range of system memory to memory portions 106, 116, and/or 126 may be determined according to a number of variables. These variables include the number of nodes in a system, the number of nodes supported by a system, the relative priorities of each node in a system, and the size of the individual memories in the nodes.

In a first example, node 100 creates the mapping of the system memory according to the number of nodes in system 10 without reference to priorities of any of the nodes. Node 100 detects three nodes in system 10—nodes 100, 110, and 120—that include memories 104, 114, and 124, respectively. In this example, node 100 creates the mapping such that a first contiguous gigabyte of memory below four gigabytes is mapped to memory portion 106 in node 100, a second contiguous gigabyte of memory below four gigabytes is mapped to memory portion 116 in node 110, and a third contiguous gigabyte of memory below four gigabytes is mapped to memory portion 126 in node 120. The remaining gigabyte of memory below four gigabytes is mapped as reserved and is not mapped to any node initially.

Although nodes 100, 110, and 120 were each assigned identical sizes of memory from the zero to four gigabytes range in this example, node 100 may map different sizes to each node 100, 110, and 120 in other examples. In addition, node 100 may map larger sizes than those in this example where fewer nodes are included in system 10 or smaller sizes than those in this example where more nodes are included in system 10.

Referring back to FIG. 2, node 100 monitors system 10 for the addition of a node during operation as indicated by a determination step 212. In response to node 100 detecting node 130 being added to system 10 as indicated by dotted line 142, node 100 adjusts and stores the system memory mapping as indicated in a step 214. Node 100 may adjust the system memory mapping by redistributing the address values between zero and four gigabytes between memory portions 106, 116, 126, and 136 in nodes 100, 110, 120, and 130, respectively, or by assigning reserved address values between zero and four gigabytes to memory portion 136 in node 130.

Referring back to the example above, node 100 may map the fourth contiguous gigabyte of memory below four gigabytes, previously reserved, to memory portion 136 in node 130 in response to node 130 being added to system 10.

In a second example, node 100 and node 120 are high priority nodes and node 110 is a low priority node. In this example, node 100 detects nodes 100, 110, and 120 in system 10. Node 100 also detects that system 10 may add up to two more nodes during runtime. In this example, node 100 creates the mapping such that a first contiguous gigabyte of memory below four gigabytes is mapped to memory portion 106 in node 100 (a high priority node) and a second contiguous gigabyte of memory below four gigabytes is mapped to memory portion 126 in node 120 (a high priority node). Node 100 reserves the remaining two gigabytes below the four gigabyte boundary and does not map any memory below the four gigabytes boundary to the low priority node 110. During runtime, node 100 detects that a high priority node, node 130, is added to system 10 as indicated by dotted line 142. In response, node 100 adjusts the system memory mapping by mapping a third contiguous gigabyte of memory below four gigabytes to memory portion 136 in node 130.

In other examples, system memory below the four gigabyte boundary may be mapped to both high priority and low priority nodes. In some of the examples, relatively larger amounts of system memory below the four gigabyte boundary may be mapped to high priority nodes than low priority nodes. The system memory may also be mapped to minimize the path lengths through interconnect 140 that one or more the nodes would need to travel to access one or more nodes or other resources of system 10.

Subsequent to the system memory being mapped in the manner described herein, an operating system detects the system memory mapping and allocates tasks to optimize the processing of system 10.

As can be seen, the principal advantages of these embodiments are that various shortcomings of previous techniques are overcome. For example, processing efficiency in a multiple processor node may be increased by ensuring that memories in each node are mapped to include addresses between zero and four gigabytes.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
   a first node for:
      detecting a first memory in the first node;
      detecting a second memory in a second node coupled to the first node;
      ensuring that a first set of contiguous addresses is mapped to a portion of the first memory, the first set of contiguous addresses each having a value lower than a four gigabyte address;
      ensuring a second set of contiguous addresses is mapped to a portion of the second memory, the second set of contiguous addresses each having a value lower than the four gigabyte address;
      detecting a maximum number of nodes that may be coupled to the first node; and
      determining a size of the portion of the first memory in response to the maximum number of nodes.

2. The information handling system of claim 1, wherein the first node is for:
   reserving a third set of contiguous addresses that each have a value lower than the four gigabyte address.

3. The information handling system of claim 2, wherein the first node is for:
   detecting a third memory in a third node coupled to the first node subsequent to the first node and the second node being booted; and
   mapping the third set of contiguous addresses to a portion of the third memory.

4. The information handling system of claim 1, wherein the first node is for:
   detecting a size of the first memory in the first node; and
   determining a size of the portion of the first memory in response to the size of the first memory.

5. The information handling system of claim 4, wherein the first node is for:
   detecting a size of the second memory in the second node; and
   determining the size of the portion of the first memory and a size of the portion of the second memory in response to the size of the first memory and the size of the second memory.

6. A method comprising:
   detecting a first memory in a first node;
   detecting a second memory in a second node coupled to the first node; ensuring that a first set of contiguous addresses is mapped to a portion of the first memory, the first set of contiguous addresses each having a value lower than a four gigabyte address;
   ensuring a second set of contiguous addresses is mapped to a portion of the second memory, the second set of contiguous addresses each having a value lower than the four gigabyte address;
   detecting a maximum number of nodes that may be coupled to the first node; and
   determining a size of the portion of the first memory in response to the maximum number of nodes.

7. The method of claim 6, further comprising:
   reserving a third set of contiguous addresses that each have a value lower than the four gigabyte address.

8. The method of claim 7, further comprising:
   detecting a third memory in a third node coupled to the first node subsequent to the first node and the second node being booted; and
   mapping the third set of contiguous addresses to a portion of the third memory.

9. The method of claim 6, further comprising:
   detecting a size of the first memory in the first node; and
   determining a size of the portion of the first memory in response to the size of the first memory.

10. The method of claim 9, further comprising:
    detecting a size of the second memory in the second node; and
    determining the size of the portion of the first memory and a size of the portion of the second memory in response to the size of the first memory and the size of the second memory.

11. An information handling system comprising:
    a microprocessor;
    a storage coupled to the microprocessor;
    a first node for:
       detecting a first memory in the first node;
       detecting a second memory in a second node coupled to the first node;
       ensuring that a first set of contiguous addresses is mapped to a portion of the first memory, the first set of contiguous addresses each having a value lower than a four gigabyte address;
       ensuring a second set of contiguous addresses is mapped to a portion of the second memory, the second set of contiguous addresses each having a value lower than the four gigabyte address;
       detecting a maximum number of nodes that may be coupled to the first node; and
       determining a size of the portion of the first memory in response to the maximum number of nodes.

12. The information handling system of claim 11, wherein the first node is for:
    reserving a third set of contiguous addresses that each have a value lower than the four gigabyte address.

13. The information handling system of claim 12, wherein the first node is for:
    detecting a third memory in a third node coupled to the first node subsequent to the first node and the second node being booted; and
    mapping the third set of contiguous addresses to a portion of the third memory.

14. The information handling system of claim 11, wherein the first node is for:
    detecting a size of the first memory in the first node; and
    determining a size of the portion of the first memory in response to the size of the first memory.

15. The information handling system of claim 14, wherein the first node is for:
    detecting a size of the second memory in the second node; and
    determining the size of the portion of the first memory and a size of the portion of the second memory in response to the size of the first memory and the size of the second memory.

* * * * *